United States Patent [19]

Bacon et al.

[11] 4,159,232

[45] Jun. 26, 1979

[54] ELECTRO-HYDROMETALLURGICAL PROCESS FOR THE EXTRACTION OF BASE METALS AND IRON

[76] Inventors: William G. Bacon; Morris J. Vreugde, both of 117 E. 4th Ave., Vancouver, B.C., Canada, V5T 1G4

[21] Appl. No.: 907,672

[22] Filed: May 19, 1978

Related U.S. Application Data

[63] Continuation-in-part of Ser. No. 835,491, Sep. 23, 1977, abandoned.

[51] Int. Cl.$^2$ .................... C25C 1/12; C25C 1/06; C25C 1/08; C25B 1/04
[52] U.S. Cl. .................... 204/107; 204/113; 204/129; 75/121
[58] Field of Search .................... 204/107, 113, 129; 75/121

[56] References Cited

U.S. PATENT DOCUMENTS

| | | | |
|---|---|---|---|
| 3,673,061 | 6/1972 | Kruesi | 204/107 |
| 3,923,616 | 12/1975 | Atadan et al. | 204/107 |
| 3,926,752 | 12/1975 | Loretto et al. | 204/107 |
| 3,958,983 | 5/1976 | Staker | 204/107 |

OTHER PUBLICATIONS

"Electrochem Data" Hanson-Van Winkle-Mumming Co., 1960.

*Primary Examiner*—R. L. Andrews
*Attorney, Agent, or Firm*—Barrigar & Oyen

[57] ABSTRACT a hydrometallurgical process for the electrolytic recovery of selected base metals (especially copper or possibly nickel) from sulphide ore concentrates concurrently with the extraction of metallic iron in a commercially usable form. The process involves dissolution and leaching of ore in acidified chloride anode solution from the electrolytic cells of a primary and secondary bank of electrolytic cells to obtain iron chloride and base metal chlorides and to reduce ferric and cupric ions (say) to their lowest valence state (e.g. ferrous, cuprous). The leaching solution is transported to and distributed equally among the cathode compartments of each bank of cells to set up a solution flow from each cathode to adjacent anode compartments. Elemental sulphur and insoluble residue resulting from the ore dissolution are extracted as is electrically reduced metallic copper. The copper is obtained from the cathode compartments of both primary and secondary banks of cells. Hydrogen gas evolved at the cathode compartment is used to reduce hydrated ferrous chloride, obtained from the cathode compartments of the secondary bank of electrolytic cells to metallic iron. The process operates continuously.

36 Claims, 2 Drawing Figures

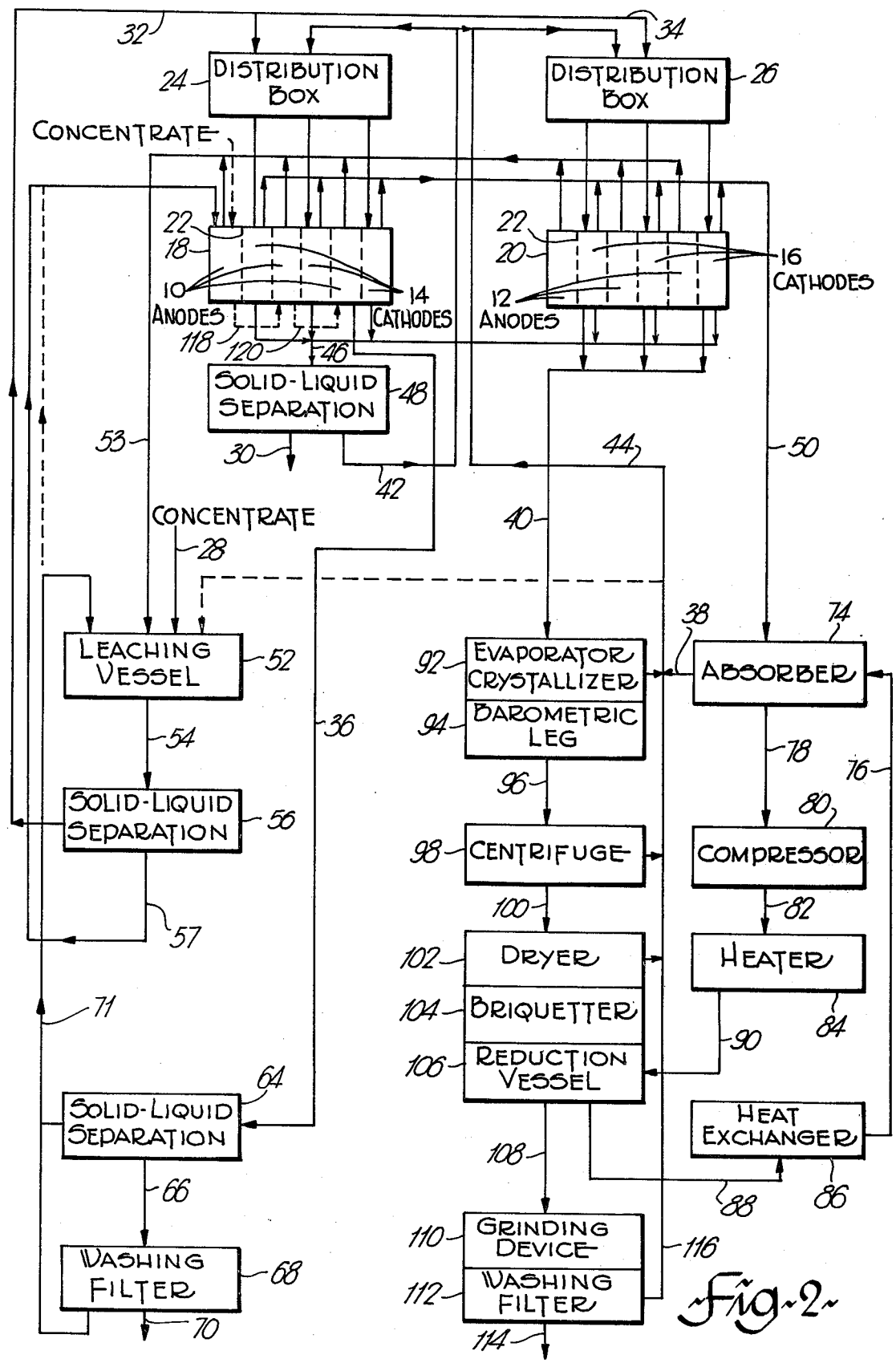

ELECTRO-HYDROMETALLURGICAL PROCESS FOR THE EXTRACTION OF BASE METALS AND IRON

BACKGROUND OF THE INVENTION

This application is a continuation-in-part of application Ser. No. 835,491, filed Sept. 23, 1977, for "Hydrometallurgical Process For The Extraction of Base Metals and Iron" (now abandoned).

This invention relates to a hydrometallurgical process for the electrolytic recovery of selected base metals such as copper or nickel concurrent with the recovery of metallic iron from sulphide ores such as chalcopyrite.

Metallurgical processes for the extraction of base metals such as copper from raw ore material generally start with a crushing and flotation process to extract the ore concentrate followed by a smelting process to recover the base metals and, finally, a refining process to separate impurities from the base metals. One method of smelting sulphide ores such as chalcopyrite has heretofore involved obtaining the iron in solution form as a chloride and subsequent removal of the iron by its oxidation with air or oxygen to produce iron oxide or by precipitation of iron sulphates (see U.S. Pat. No. 3,785,944, Atwood, Jan. 15, 1974). However, the foregoing methods involve treating the resultant iron concentrate as waste and entail disposal problems in returning the iron compounds to the environment. Moreover, oxidation methods involve the additional expense of adding oxygen to the system. Removal and recovery of the iron directly by electrolytic means is possible but requires a relatively large amount of electrical energy and is, therefore, uneconomical. Hydrogen production in the foregoing electrolysis methods of base metal production is conventionally regarded as waste since it is generally desirable to use the electrical energy only for reduction of metal, and not for the unwanted production of hydrogen.

It is accordingly, an object of the present invention to provide a hydrometallurgical process for the extraction of base metals from sulphide ore concentrates accompanied by the simultaneous removal of iron without the necessity for adding oxygen or other substances to accomplish the iron separation.

It is a further object of the present invention to provide a hydrometallurgical process for the extraction of base metals from sulphide ore concentrates which separates out iron in metallic, commercially usable form.

It is a further object of the present invention to provide a hydrometallurgical process for the extraction of base metals from sulphide ore concentrates and the concurrent recovery of iron from the latter by utilizing the hydrogen gas to reduce the iron to metallic form.

It is a further object of the present invention to provide a hydrometallurgical process for the extraction of base metals from sulphide ore concentrates which recycles all process solutions.

It is a further object of the present invention to provide a hydrometallurgical process for the extraction of base metals from sulphide ore concentrates which is of a relatively high efficiency.

SUMMARY OF THE INVENTION

To achieve the above and other objects, the present invention provides, a process for the electrolytic recovery of a selected base metal from ore concentrate in the form of base metal sulphide also containing iron, utilizing at least a primary and secondary bank of sequentially disposed electrolytic cells, with the cells of each bank electrically connected in parallel or an equivalent arrangement. Each of the cells are provided with separate anode and cathode compartments and each such compartment is separated from adjacent compartments in a bank by a permeable dividing element capable of passing electrolyte between the compartments. The improved process comprises continuously withdrawing a first supply of anode solution from the anode compartments of the electrolytic cells and each bank of cells, the anode solution being an aqueous electrolyte including hydrochloric acid and a soluble metal chloride. The last mentioned anode solution is used to continuously leach a first supply of ore concentrate in a leaching stage which includes at least one leaching vessel in order to reduce iron ions to their lowest (ferrous) valence state. Solids and liquid in the resulting slurry output from the leaching stage, the slurry including solid residue, partially leached concentrate and leaching solution, are separated and the separated liquid portion returned to the cathodes of the electrolytic cell in each bank of cells. Base metal deposits are continuously withdrawn from the cathode compartments of each bank of cells and base metal impoverished cathode solution is continuously withdrawn from the cathode compartments of the secondary bank of cells. Hydrogen gas produced in the catholyte of the electrolytic cells in each bank of cells is used to reduce hydrated ferrous chloride at a selected elevated temperature, the hydrated ferrous chloride being produced by evaporation and crystallization of the base metal impoverished cathode solution.

The process is applicable to the base metals copper and nickel. To achieve efficient dissolution of the ore concentrate, the temperature of the electrolyte which consists of five or ten percent of hydrochloric acid and two N to four N of a select saline metal chloride other than iron or the base metal chloride is maintained in the range of 80° C. to less than the boiling point of the electrolyte. A preferred embodiment of the process includes dissolution and leaching of the ore concentrate in a separate leaching vessel by anode solution taken from the anode compartments of primary and secondary banks of cells. In the latter arrangement, solid and liquid in the resulting slurry output from a first leaching vessel is separated and the resulting solid further leached by a portion of the anode solution in a second leaching vessel, following which the slurry output from the second leaching vessel is again separated into its solids and liquid components. Separated liquid from both leaching vessels is returned to the cathode compartments of each bank of cells.

Alternatively, ore concentrate can also be dissolved in one or more anode compartments of the primary bank of cells as well as in a leaching vessel and the separated solids in the slurry output of the leaching vessel returned to the anode compartments. In the latter embodiment anode solution is pumped in succession from the compartment having the highest amount of undissolved concentrate to each anode compartment in turn, and ending with the anode compartment having the least amount of undissolved concentrate. Solid residue is removed from at least the anode compartment having the least amount of undissolved concentrate by directing the solids rich slurry therefrom to a solid-liquid separation stage. The solution enriched in suspended base metal which is extracted from each cathode of each bank of cells is separated into its solid and liquid phases and the resulting liquid returned to the cathodes. In the primary bank of cells, the rate of extraction of solution enriched in suspended base metal and return of separated liquid is sufficiently great to distribute the base metal solution throughout each compartment. In order to provide a source of base metal impoverished solution, a secondary bank of cells is employed in which the rate of withdrawal of the solution enriched in suspended base metal is much lower than the rate of withdrawal of the corresponding solution in the primary cell. Accordingly, the amount of base metal contained in base metal impoverished solution in such a secondary bank of cells is much lower so that the resulting separated iron extracted therefrom contains less base metal contamination.

SUMMARY OF THE DRAWINGS

In the drawings,

FIG. 2 is a flow chart schematically illustrating an alternative embodiment of a sulphide ore concentrate processing system wherein concentrate is dissolved in at least one anode compartment of a primary bank of electrolytic cells.

DETAILED DESCRIPTION WITH REFERENCE TO THE DRAWINGS

Figure 1:
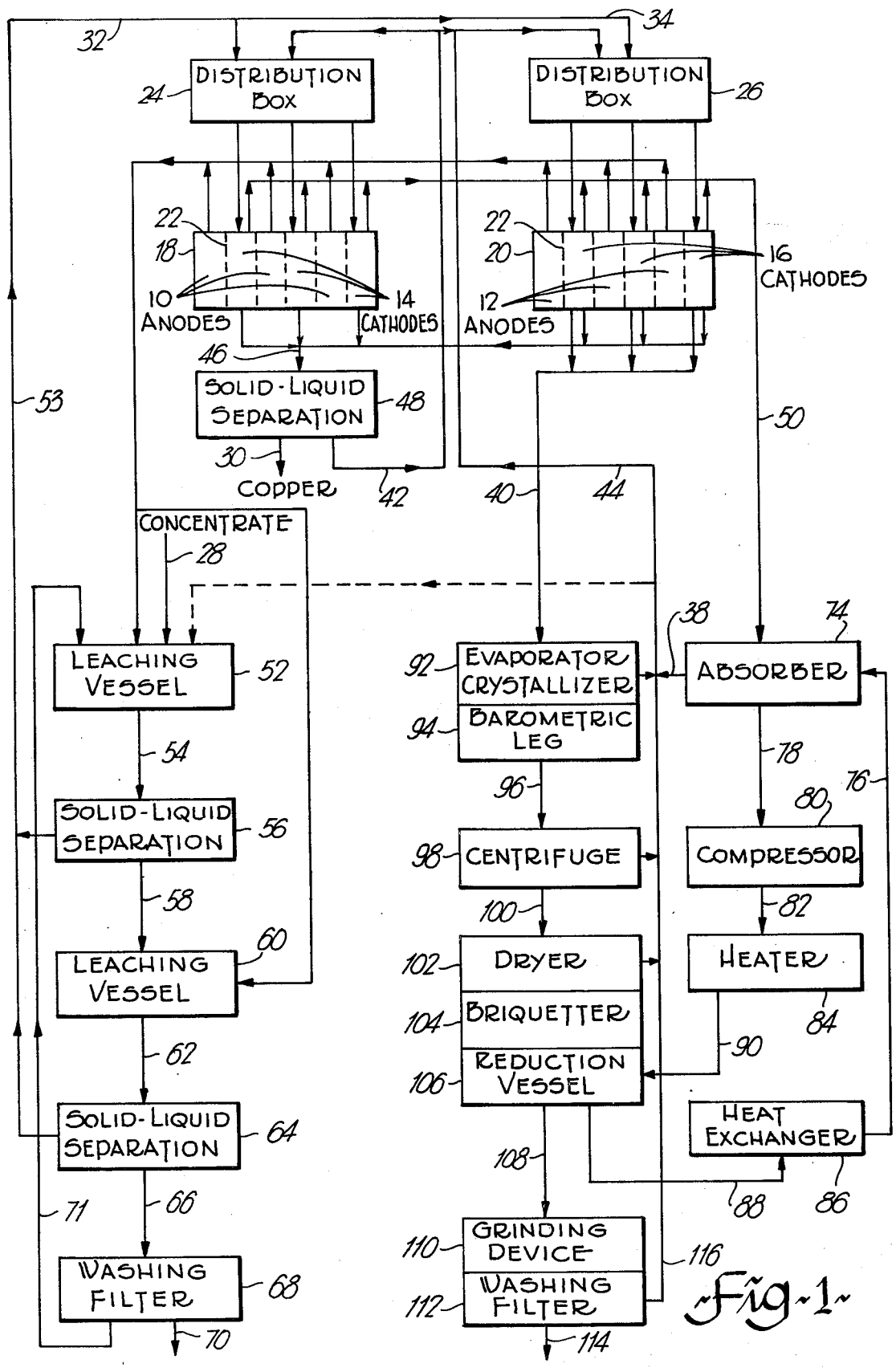
FIG. 1 is a flow chart schematically illustrating a preferred sulphide ore concentrate processing system wherein all concentrate is dissolved sequentially in leaching vessels.

A representative process according to the invention will be described with reference to the treatment of copper and iron containing chalcopyrite ore concentrates. Persons skilled in the art will recognize the applicability, mutatis mutandis, of the principles discussed below to the treatment of other sulphide ores such as, for example, pentlandite, marmatite and bornite.

Referring to FIG. 1, ore concentrates in the form of base metal sulphides are added to a first leaching vessel 52, which contains electrolyte obtained by allowing solution in the anode compartments 10 and 12 of primary and secondary banks of electrolytic cells 18 and 20 to overflow. The overflow anode solution is carried to the leaching vessel through overflow line 52 wherein it leaches the ore concentrate 28.

Initially the electrolyte into which the fresh ore concentrate is dissolved is made of five to ten percent by weight of hydrochloric acid and two to four N sodium chloride at a temperature in the range of approximately 80° C. to 107° C. The foregoing process would be operative using any of the alkali chlorides or alkaline earth metal chlorides in place of sodium chloride, however, the current efficiency of the process would vary greatly. The particle size of the ore concentrate prior to dissolution is reduced to increase the rate of reaction. The optimum amount of reduction is determined by a balance of process efficiency and cost of reduction which may vary depending upon the method of reduction etc.

Following leaching of the ore concentrate in the first leaching vessel, the resulting slurry output consisting of partially leached ore concentrate, elemental sulphur and leaching solution is directed through first leach line 54 to a solid-liquid separator 56 wherein the resulting liquid and solids making up the slurry are separated from one another and the separated solid directed through first solid separation line 58 to a second leaching vessel 60. The separated solids are further leached by a portion of the overflow anode solution directed into the second leaching vessel through auxiliary overflow line 55. Both the first and second leaching vessels are insulated in order to maintain the desired elevated temperature of the electrolyte with a minimum of heat loss. The electrolyte itself is heated through normal electrolytic current passing through the electrolytic cells and depending on the amount of such current may be further heated by heaters which project into the leaching vessels which are not shown in the drawings. The slurry output from the second leaching vessel 60 is directed through second leach line 62 to a solid-liquid separator 64 which separates solids in the resulting slurry output of the second leaching vessel from liquid. The separated solids consist primarily of sulphur in addition to other solid residue which passes through solid line 66 to a washing filter 68 wherein the solid material is washed with a wash solution that is normally water. Both the leaching vessels 52 and 60 and the solid-liquid separation devices 56 and 64 are airtight to prevent oxidation of ionic species contained therein. Clarified solution from both the solid-liquid separation devices 56 and 64 is returned via separated liquid line 32 to primary and secondary distribution boxes 24 and 26, the level of liquid in which controls the liquid level in and distributes liquid to each anode in the primary and secondary bank of electrolytic cells 18 and 20, respectively. All recovered process solution together with wash solution is returned to the first leaching vessel 52 through wash line 71.

The electrodes of the electrolytic cells may be any material compatible with the reactions taking place at the electrodes. While titanium or precious metal electrodes will work as anodes, their cost is prohibitive. Consequently, carbon or graphite is preferably used for the anode electrodes. Since the cathode material is not subjected to as severe chemical conditions as is the anode, stainless steel or copper can be used for the cathode electrodes. An external direct current power source not shown in the drawing is connected between anode and cathode terminals of the electrolytic cell with the positive terminal of the source attached to the respective anode terminals of the electrolytic cells in each bank of cells and the negative terminal of the source attaches to the cathode terminal of the cells the sources selected to provide an adjustable low voltage suitable for the electrolytic reactions. Current densities used in the operation of the cells are normally in the range of 70 amperes per square foot to 160 amperes per square foot.

Metallic copper in the form of powder precipitated at the cathode electrode in the form of small loosely bound individual flakes is removed from a slurry of cathode solution along copper slurry line 46 to a solid-liquid separation device 48 from which copper in the form of powder is removed along copper line 30. Separated liquid from the solid-liquid separation device 48 is returned to the primary and secondary distribution box along copper liquid line 42 for subsequent return to the cathode compartments 14 and 16 of the primary and secondary bank of electrolytic cells 18 and 20 respectively. In the latter circulation process catholyte in each cathode compartment is circulated at the rate of 20 percent of its volume per minute in order to prevent the development of copper impoverished areas adjacent to the cathode electrodes, the development of which would reduce and ultimately stop the electrolytic reactions. Because of this high circulation of copper in solution, it is necessary to operate a secondary bank of electrolytic cells with lower rates of circulation therein in order that copper impoverished areas of the solution are developed. The development of copper impoverished solution areas occurs by virtue of the heaviness of the copper chloride which when injected into a cathode compartment, falls quickly and leaves in the area immediately opposite its point of injection a copper deficiency. It is from such a latter location that solution which has a deficiency of copper is removed through a catholyte line 40 to an evaporation-crystallization device 92 where the solution is heated under vacuum to effect a concentration and subsequent crystallization of hydrated ferrous chloride and sodium chloride. Optionally, the copper impoverished catholyte may be treated prior to evaporation by conventional means to extract from it impurities containing dissolved base or precious metals such as gold, silver, antimony, bismuth, zinc, arsenic, cadmimum and lead. Following evaporation the resultant slurry of crystals are then removed by a barometric leg 94 via a centrifuge line 96 to a centrifuge 98. Crystals discharged from the centrifuge 98 pass through a crystal line 100 to a flash dryer 104 where the ferrous chloride tetrahydrate is dehydrated to the dihydrate state. The dried crystals are then passed to a briquetting machine 104 where they are formed into pellets before being transported to a reduction vessel 106. Reduction of the ferrous chloride to iron takes place in the reduction vessel 106 with the use of hydrogen gas maintained at a selected elevated temperature of between 425° C. and 800° C. Temperatures must remain below the melting point of sodium chloride which is 801° C. The hydrogen gas used in the reduction vessel is collected from gas evolved at the cathode of the primary and secondary bank of electrolytic cells 14 and 16, transported by a gas line 50 to an absorber 74 where hydrochloric acid is removed. The purified hydrogen gas is then carried via hydrogen line 78 to a compressor 80 where the hydrogen gas is compressed before being moved by compressor line 82 to heater 84. Hydrogen gas heated in the heater unit 84 is then ready for use in the reduction vessel 106 to which it is directed by hot line 90. Following reduction, gas in the reduction vessel 106 is removed by an exit line 88 to a heat exchanger 86 where it is cooled before being passed through a heat exchanger line 76 to the absorber 74. The absorber removes the hydrogen chloride acid produced in the reduction vessel 106 and recycles the hydrogen gas to the reduction vessel 106 while hydrochloric acid is taken from the absorber 74 via hydrochloric acid line 38 to return line 44 and returned to the secondary distribution box 26. The reduced iron and sodium chloride crystals left in the reduction vessel 106 are ground to a fine powder in a grinding device 110 and then treated in a washing filter 112 for the removal of sodium chloride. The wash solution may be simply cold water with no chemical additions. The resulting iron powder is removed by iron line 114 from the washing filter. Process solutions from the evaporator-crystallizer 92, centrifuge 98, flash dryer 102 and washing filter 112 are all returned by the return line 44 to the secondary distribution box 26.

An alternative embodiment of the invention is illustrated in FIG. 2 wherein ore concentrates are added to at least one anode compartment of the primary bank of electrolytic cells 18.

In practice, ore concentrate is mixed first with electrolyte in a mixing tank not shown in the drawing prior to being added to the anode compartment although concentrate is shown as being added only to one anode compartment, in practice it may be added to other anode compartments in the primary bank of electrolytic cells as well. It should also be noted that although FIGS. 1 and 2 depict primary and secondary banks of electrolytic cells with three cells each, in practice, the number of cells may be varied in accordance with the practical requirements of the system.

In order to keep solids in suspension and to aid the dissolution of concentrate, anode solution is pumped from the anode compartment in which the concentrate is first added by a pump through pump line 118 to a second anode compartment, and from the second anode compartment through pump line 120 to a third anode compartment wherein the concentration of undissolved concentrate is the lowest with respect to all of the anode compartments in the primary bank of cells 18. A slurry consisting of solid residue and coloidal sulphur together in a solution containing sodium chloride, ferric chloride, cupric chloride and hydrochloric acid is extracted from the last mentioned anode compartment through a residue line 36 and directed to a solid-liquid separation device 64. Clarified solution from the latter device is allowed to overflow and is directed through an overflow line 71 to a first leaching vessel 52. Alternatively the latter fluid may be directed to an anode compartment 10 of the primary bank of electrolytic cells 18. Separated solids from the solid-liquid separation device 56 are returned via the solids line 57 to the anode compartment 10 of the primary bank of cells 18 in which concentrate is added. The operation of the process of FIG. 2 is otherwise the same as that illustrated in FIG. 1.

A suitable particle size for the present process was found to be approximately seventy to eighty percent by weight minus 325 mesh (37 microns). The overall equation for dissolution of the chalcopyrite ore concentrate at the anode is as follows:

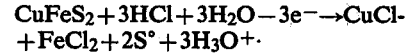

Initially, cuprous chloride is transported to the cathode following leaching by solution line 32 and undergoes a reduction to metallic copper according to the following equation:

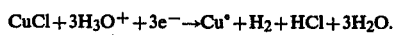

At the cell voltages employed for normal cell operation, ferrous iron ($Fe^{2+}$) is oxidized to the ferric state ($Fe^{3+}$) and much of the cuprous iron ($Cu^+$) is oxidized to the cupric state ($Cu^{2+}$) according to:

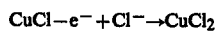

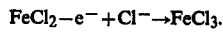

As the level of ferric chloride ($FeCl_3$) builds up, the primary reaction in the anode becomes the following:

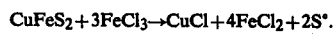

This is accompanied by the corresponding reaction relating to the reduction of cupric chloride to the cuprous chloride state according to the following:

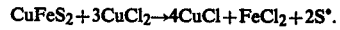

It can be seen that if cupric chloride and ferric chloride were allowed to migrate to the cathode or if anode solution were fed directly to the cathode compartment the ferric chloride would absorb an electron and would be reduced to ferrous chloride and the cupric chloride would absorb two electrons before being reduced to metallic copper. Thus, there would result a very low cathodic current efficiency and a severe reduction in the amount of hydrogen gas liberated at the cathode. The present invention prevents the foregoing problems by extracting anode solution and using it to leach fresh ore concentrate thereby reducing the ferric chloride to ferrous chloride and the cupric chloride to cuprous chloride. In order, however, to prevent migration of the ferric chloride and cupric chloride through the porous membranes 22 into the cathode compartments, a solution flow from each cathode compartment to each adjacent anode compartment is established by returning clarified leaching solution after the leaching process to the cathodes via primary and secondary distribution boxes 24 and 26 rather than through the anodes. The resulting solution flow from cathode to anode also helps to keep the membranes 22 from becoming blinded by fine solids. The membranes 22 thus must be permeable to the electrolyte but prevent solids from passing. A woven glass membrane has been found to be acceptable as a membrane material.

As chalcopyrite is leached, very fine elemental sulphur forms at the surface of the individual particles. In the embodiment of FIG. 2, if this sulphur is allowed to build up on the surface, dissolution of additional chalcopyrite is prevented and sulphur is oxidized to sulphate. Since six electrons are required to oxidize sulphur to sulphate, if this reaction is not prevented, very low anodic current efficiencies are achieved. Abrasion of the sulphur layer through contact with other particles is effective in removing the sulphur from the surface. It is therefore important that solids concentrations in the anode compartments be maintained at high levels. This concentration can be adjusted by changing the rate at which ore concentrate is added to the anode compartment in the embodiment of FIG. 2 and to the leaching vessel. The relative concentrations in the anode compartments of the primary bank of cells can also be modified by controlling the rate at which anode solution is pumped from one anode compartment to another.

Copper deficient cathode solution removed from the cathode compartments of the secondary bank of electrolytic cells when concentrated and cooled yields ferrous chloride tetrahydrate and sodium chloride crystals. Excessive shrinkage during water loss and other factors make direct reduction of the latter crystals to metallic iron difficult regardless of whether the material is loose or formed into briquets. By drying the material prior to reduction so that ferrous chloride tetrahydrate is dehydrated to the dihydrate state, reduction of the mixture of crystals can be accomplished without difficulty in producing a coherent iron product. The sodium chloride removed by washing together with hydrochloric acid produced during the reduction of the chloride crystals is returned to the electrolytic cells of the secondary bank of cells through the secondary distribution box 26 in order to maintain a chemical balance. Additionally, cathode solution removed from the evaporation, centrifuging and drying process are also returned to the secondary distribution box 26 so that all process solutions are recycled and only losses require addition of fresh electrolyte. Since system losses of hydrogen gas may be expected in normal circumstances, additional hydrogen is required to be added to make up these losses.

Since some sulphur can be expected to be oxidized to sulphate even under ideal conditions, provisions must be made for periodic elimination of sulphate from the system. This can be accomplished through the addition of calcium chloride to form a calcium sulphate residue for disposal.

Choice of the operating cell voltage is governed on the one hand by the desire for greater hydrogen production which increases with increasing cell voltage and on the other hand by increasing electrical energy requirements for copper production. At equal solids and electrolyte concentrations, for example, a cell voltage of 2.2 volts gave an electrical requirement of 1.55 kwh per pound of copper solubilized while 2.9 volts resulted in an electrical requirement of 2.40 kwh per pound of copper solubilized. The process has been found to be operative over the range of 1.6 volts to 3.4 volts with an electrode spacing of 1.75 inches. Electrode spacings of 1 to 3 inches have been found to be effective.

The effectiveness of the reduction process has been indicated by a test carried out at 500° C. for 120 minutes duration with a briquet consisting of six parts hydrated ferrous chloride ($FeCl_2 \cdot 2.5\ H_2O$) to one part sodium chloride by weight, produced, after washing to remove sodium chloride, iron of 99.6% Fe.

The change and amount of concentration of iron and copper ionic species with time was investigated in laboratory bench tests which gave the results shown in TABLE I of ionic concentrations in the anode solution as a function of time for a cell voltage of 2.9 volts.

TABLE 1

| Cell Operating Time (Hours) | Anolyte Grams/Liter | | | |
|---|---|---|---|---|
| | $Fe^{3+}$ | $Fe^{2+}$ | $Cu^{2+}$ | $Cu^+$ |
| 1 | 2.7 | 2.4 | 2.4 | 0.7 |
| 2 | 4.0 | 1.6 | 3.5 | 0.8 |
| 3 | 4.6 | 1.8 | 3.4 | 2.2 |
| 4 | 5.9 | 1.6 | 3.8 | 2.0 |
| 5 | 6.8 | 2.0 | 4.2 | 2.3 |
| 6 | 7.0 | 1.6 | 4.8 | 2.2 |

The concentration levels shown above are indicative of the nature of solutions encountered in the process but may be at any level provided they remain below the point where crystallization of metal chlorides takes place.

The importance of solids concentration in efficient process performance has also been investigated by similar laboratory tests, the results of which are shown in TABLE II:

TABLE II

| Solids Concentration Grams/Litre | Power Requirement kwh/lb Cu Solubilized |
|---|---|
| 34 | 6.59 |
| 134 | 3.98 |
| 330 | 2.40 |

It is apparent that choosing a high solids concentration in the anode minimizes the power required to solubilze a given quantity of copper.

It should be noted that the process described herein is operated on a continuous basis and does not require special equipment.

It should also be noted that when operating a number of cells in series, the solids concentration in the different cells will normally vary from cell to cell and it may be desirable in certain circumstances to adjust the solids concentration in one or more cells by pumping slurry from the output of the leaching vessel to said one or more cells.

What we claim is:

1. In a continuous hydrometallurgical process for the electrolytic recovery of a selected base metal from ore concentrate in the form of base metal sulphide compounds containing iron, said process utilizing at least a primary and secondary bank of sequentially disposed electrolytic cells, the cells of each bank electrically connected in parallel, or the equivalent thereof, each said cell having separate anode and cathode compartments and each said compartment separated from adjacent said compartments in a bank by a permeable dividing element capable of passing electrolyte between the compartments, the improvement which comprises:

continuously withdrawing a first supply of anode solution from the anode compartments of the electrolytic cells in each bank of cells, said anode solution being an aqueous electrolyte including in solution hydrochloric acid and a soluble metal chloride, continuously leaching a first supply of ore concentrate by said first supply of anode solution in at least one leaching vessel to reduce ferric ions to their lowest (ferrous) valence state, separating solids from liquid in the resulting slurry output from the leaching vessel the slurry including solid residue, partially leached concentrate and leaching solution, returning the separated leaching liquid from the slurry output of the leaching vessel to the cathode compartments of both the primary and secondary banks of cells with a first preselected portion of said liquid being returned to the cathode compartments of the secondary bank of cells, continuously withdrawing base metal deposits from a base metal slurry comprising cathode solution and precipitated base metal obtained from the cathode compartments of each bank of cells, returning the separated cathode solution obtained from the base metal slurry to the cathode compartments of both the primary and secondary bank of cells with a second preselected portion of the separated cathode solution being returned to the cathode compartments of the secondary bank of cells, the amounts of said first and second preselected portions being small enough to allow for the establishment in said cathode compartments of base metal impoverished solution areas and the amounts of remaining separated leaching liquid and separated cathode solution returned to the cathode compartments of the primary bank of cells, being large enough to avoid the development of base metal impoverished areas next to the cathode electrodes of the primary bank of cells, continuously withdrawing base metal impoverished cathode solution from the base metal impoverished solution areas of the cathode compartments of the secondary bank of cells, cathodically producing hydrogen gas from the catholyte of the electrolytic cells in each bank of cells, evaporating and crystallizing base metal impoverished cathode solution to yield hydrated ferrous chloride, and reducing the said hydrated ferrous chloride by the hydrogen gas at a selected elevated temperature to produce metallic iron.

2. A process as defined in claim 1 wherein the base metal is selected from the group consisting of copper and nickel and mixtures of copper and nickel.

3. A process as defined in claim 2, wherein the aqueous electrolyte used to dissolve the ore concentrate consists of five to ten percent by weight of hydrochloric acid and two N to four N of a selected soluble metal chloride other than iron chlorides or chlorides of said base metal and said electrolyte is maintained within the temperature range of about 80° C. to less than the boiling point of the electrolyte.

4. A process as defined in claim 3, wherein the selected soluble metal chloride is selected from the group consisting of sodium chloride, potassium chloride and magnesium chloride.

5. A process as defined in claim 4, wherein the selected elevated temperature is maintained below the melting point of the soluble metal chloride.

6. A process as defined in claim 5, wherein the selected soluble metal chloride is sodium chloride and the selected elevated temperature is in the range of 425° C. to 800° C.

7. A process as defined in claim 6, wherein the salts in said base metal impoverished solution are crystallized by evaporation, centrifuged, heated in a dryer to convert the ferrous chloride tetrahydrate thereby obtained to the dihydrate state, formed into briquets, reduced to metallic iron and sodium chloride in a reduction vessel, ground into powder and then washed to remove the sodium chloride.

8. A process as defined in claim 7, wherein liquid returned to the cathode compartments of primary and secondary banks of cells through associated primary and secondary distribution boxes which maintain an equal level of catholyte in each cathode compartment of each bank of cells.

9. A process as defined in claim 8, wherein a second supply of ore concentrate is continuously dissolved in the anode electrolyte of at least one anode compartment of said primary bank of cells.

10. A process as defined in claim 9 wherein anode solution from the anode compartment having the greatest amount of undissolved ore concentrate in the primary bank of cells is continuously pumped to anode compartments having successively lower amounts of undissolved ore concentrate in the said primary bank of cells.

11. A process as defined in claim 10, wherein a second supply of anode solution is withdrawn from at least the anode compartment of said primary bank of cells which has the lowest solids concentration of the solution in those compartments in said bank.

12. A process as defined in claim 11, wherein solids are separated from liquid in said second supply of anode solution.

13. A process as defined in claim 12, wherein said last mentioned separated liquid is returned to the said distribution boxes.

14. A process as defined in claim 12, wherein the separated solids are washed and the wash solution returned to the said leaching vessel.

15. A process as defined in claim 12, wherein the separated solids are washed and the resulting wash solution returned to at least one anode compartment.

16. A process as defined in claim 12, wherein the selected base metal is copper, the ore concentrates comprise chalcopyrite, and the operative anodic chemical reactions occurring in the leaching vessel and said anode compartments are:

$$CuFeS_2 + 3HCl + 3H_2O - 3e^- \rightarrow CuCl + FeCl_2 + 2S^\circ + 3H_3O^+$$

and $$CuFeS_2 + 3FeCl_3 \rightarrow CuCl + 4FeCl_2 + 2S^\circ$$

and $$CuFeS_2 + 3CuCl_2 \rightarrow 4CuCl + FeCl_2 + 2S^\circ$$

and wherein the operative cathodic chemical reaction occurring in the said cathode compartments is:

$$CuCl + 3H_3O^+ + 3e^- \rightarrow Cu^\circ + H_2 + HCl + 3H_2O.$$

17. A process as defined in claim 8, wherein withdrawal of base metal deposits from the cathode compartments of each bank of cells is comprised of the steps of withdrawing from each said cathode compartment base metal cathode solution, enriched in suspended base metal separating solid from liquid in said cathode solution, and returning the separated liquid to said distribution boxes.

18. A process as defined in claim 17, wherein ore concentrate is first leached by a portion of said first supply of anode solution in a first leaching vessel, slurry including solid residue, partially leached concentrate and leaching solution withdrawn from said first leaching vessel, solids separated from liquids in said slurry and the separated liquid returned to said primary and secondary distribution boxes.

19. A process as defined in claim 18, wherein separated solids from said first leaching vessel are further leached by a remaining portion of said first supply of anode solution in a second leaching vessel, slurry, including solid residue, partially leached concentrate and leaching solution, withdrawn from said second leaching vessel, solids separated from liquids in said slurry and the separated liquid returned to said primary and secondary distribution boxes.

20. A process as defined in claim 8 wherein the solution used in washing of the iron and sodium chloride is returned to the distribution boxes.

21. A process as defined in claim 8, wherein the solution used in washing of the iron and sodium chloride is returned to the said leaching vessel.

22. A process as defined in claim 20, wherein copper is the selected base metal.

23. A process as defined in claim 20, wherein nickel is the selected base metal.

24. A process as defined in claim 8, wherein the separated solids are washed and the resulting wash solution returned to the said first leaching vessel.

25. A process as defined in claim 24, wherein the selected base metal is copper, the ore concentrates comprise chalcopyrite, and the operative anodic chemical reactions occurring in the leaching vessel and said anode compartments are:

$$CuFeS_2 + 3HCl + 3H_2O - 3e^- \rightarrow CuCl + FeCl_2 + 2S^\circ + 3H_3O^+$$

and $$CuFeS_2 + 3FeCl_3 \rightarrow CuCl + 4FeCl_2 + 2S^\circ$$

and $$CuFeS_2 + 3CuCl_2 \rightarrow 4CuCl + FeCl_2 + 2S^\circ$$

and wherein the operative cathodic chemical reaction occurring in the said cathode compartments is:

$$CuCl + 3H_3O^+ + 3e^- \rightarrow Cu^\circ + H_2 + HCl + 3H_2O.$$

26. A process as defined in claim 6, wherein the gaseous production output of the catholyte is a mixture including hydrogen gas and said mixture is passed through an absorber to remove any hydrogen chloride gas from the hydrogen gas.

27. A process as defined in claim 26, wherein the hydrogen gas after passing through the absorber is compressed and heated before being applied to the reduction of iron in a reduction vessel.

28. A process as defined in claim 27, wherein following reduction, the gas in the reduction vessel is cooled and returned to the absorber to remove hydrogen chloride gas, and any remaining hydrogen gas is recycled to the reduction vessel.

29. A process as defined in claim 28, wherein the hydrogen chloride gas extracted by the absorber is dissolved in an aqueous solution and returned to the cathode compartments of primary and secondary banks of the said cells.

30. A process as defined in claim 28, wherein the hydrogen chloride gas extracted by the absorber is dissolved in an aqueous solution and returned to the said leaching vessel.

31. A process as defined in claim 6, wherein evaporation and crystallization step yields a mixture of ferrous chloride tetrahydrate and sodium chloride.

32. A process as defined in claim 31, wherein the ferrous chloride tetrahydrate is converted to the dihydrate state prior to reduction of the iron with hydrogen gas.

33. A process as defined in claim 6, wherein the electrode spacing is within the range of 1.0 to 3.0 inches.

34. A process as defined in claim 33, wherein the anode to cathode voltage applied is in the range of 1.6 to 3.5 volts with an electrode spacing of the order of 1.75 inches.

35. A process as defined in claim 34, wherein impurity elements present in the cathode solution are recovered from the base metal impoverished cathode solution prior to evaporation of the solution for ferrous chloride crystallization.

36. A process as defined in claim 6, wherein the selected base metal is copper, the ore concentrates comprise chalcopyrite, and the operative anodic chemical reactions occurring in the leaching vessel and said anode compartments are:

$$CuFeS_2 + 3HCl + 3H_2O - 3e \rightarrow CuCl + FeCl_2 + 2S^\circ + 3H_3O^+$$

and $$CuFeS_2 + 3FeCl_3 \rightarrow CuCl + 4FeCl_2 + 2S^\circ$$

and $$CuFeS_2 + 3CuCl_2 \rightarrow 4CuCl + FeCl_2 + 2S°$$

and wherein the operative cathodic chemical reaction occurring in the said cathode compartments is:

$$CuCl + 3H_3O^+ + 3e^- \rightarrow Cu° + H_2 + HCl + 3H_2O.$$

* * * * *